(12) United States Patent
Kobayashi

(10) Patent No.: US 8,861,026 B2
(45) Date of Patent: Oct. 14, 2014

(54) IMAGE FORMING APPARATUS

(71) Applicant: KYOCERA Document Solutions Inc., Osaka (JP)

(72) Inventor: Yuki Kobayashi, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/685,813

(22) Filed: Nov. 27, 2012

(65) Prior Publication Data

US 2013/0135652 A1 May 30, 2013

(30) Foreign Application Priority Data

Nov. 29, 2011 (JP) ................. 2011-260970

(51) Int. Cl.
*G06F 15/00* (2006.01)
*G06F 3/12* (2006.01)
*H04N 1/00* (2006.01)

(52) U.S. Cl.
CPC ............ *H04N 1/0097* (2013.01); *G06F 3/1285* (2013.01); *G06F 3/1238* (2013.01); *G06F 3/1291* (2013.01); *G06F 3/1258* (2013.01); *G06F 3/1257* (2013.01); *G06F 3/1204* (2013.01); *G06F 3/1205* (2013.01)
USPC ............................. 358/1.9; 358/1.15; 358/1.13

(58) Field of Classification Search
None
See application file for complete search history.

(56) References Cited

U.S. PATENT DOCUMENTS

| | | | |
|---|---|---|---|
| 2001/0038462 A1 | 11/2001 | Teeuwen et al. | |
| 2003/0137680 A1 | 7/2003 | Maruoka | |
| 2007/0236725 A1* | 10/2007 | Harmon et al. | 358/1.15 |
| 2009/0021757 A1* | 1/2009 | Liu et al. | 358/1.13 |
| 2010/0165374 A1 | 7/2010 | Maekawa | |
| 2011/0216349 A1* | 9/2011 | McCorkindale et al. | 358/1.15 |
| 2012/0262742 A1* | 10/2012 | Yano et al. | 358/1.9 |

FOREIGN PATENT DOCUMENTS

| | | |
|---|---|---|
| EP | 01229724 A2 | 8/2002 |
| JP | 2008-22107 A | 1/2008 |

OTHER PUBLICATIONS

EESR issued to EP Application No. 12193896.3, mailed Dec. 2, 2013.

* cited by examiner

*Primary Examiner* — Mark Zimmerman
*Assistant Examiner* — Helen Q Zong
(74) *Attorney, Agent, or Firm* — Knobbe Martens Olson & Bear LLP

(57) ABSTRACT

When a job setting storing portion 103 stores a job setting of a job executed in an image forming apparatus 1 in a USB memory, identification information entered by a user and accepted by an identification information acceptance portion 102 is stored in association with the job setting. In addition, when the user causes the image forming apparatus 1 to read and execute the job indicated by the job setting stored in the USB memory, a job setting acceptance portion 105 acquires the job setting associated with the identification information entered by the user from the USB memory.

3 Claims, 11 Drawing Sheets

IMAGE FORMING APPARATUS

This application is based on and claims the benefit of priority from Japanese Patent Application No. 2011-260970, filed on Nov. 29, 2011, the entire contents of which are incorporated herein by reference.

BACKGROUND

The present disclosure relates to an image forming apparatus, and particularly to a technique of storing a setting of a job to be executed by the image forming apparatus in an external storage medium, and of obtaining the setting from the external storage medium.

Conventionally, many different jobs are executed by a plurality of users in an image forming apparatus such as a multifunction peripheral with various functions, for example a copy function and a scanning function. As such an image forming apparatus, an apparatus has been known that allows a user to store a setting of a job already executed in an external storage medium such as a USB memory, and to easily execute a job having the same contents by applying the setting thus stored in the external storage medium to the image forming apparatus, when the user operates the image forming apparatus next time.

However, in the conventional image forming apparatus as described above, if a large number of job settings are stored in the external storage medium, the user is required to select a job setting to be applied to the image forming apparatus from a large number of options. Accordingly, it may be difficult for the user to select a desired job setting. In addition, if the external storage medium storing the job settings happens to be acquired by a third party, it may be that the third party easily causes another image forming apparatus to read the job settings. In this manner, it may be that the unauthorized third party executes the job settings by the image forming apparatus.

SUMMARY

In an aspect of the present disclosure, an image forming apparatus includes a job setting acceptance portion, a control portion, an interface, an identification information acceptance portion, a job setting storing portion, a specific information acceptance portion and a job setting acquisition portion. The job setting acceptance portion accepts an input of a job setting indicating contents of a job from a user. The control portion executes the job setting accepted by the job setting acceptance portion. The interface is connected to an external storage medium, the interface reading data from and writing data to the external storage medium. The identification information acceptance portion accepts an input of identification information for identifying the job setting from the user. The job setting storing portion associates the identification information accepted by the identification information acceptance portion with the job setting executed by the control portion and to store the job setting and the identification information in the external storage medium via the interface. The specific information acceptance portion accepts from the user the identification information for specifying the job setting to be acquired from the external storage medium, when the external storage medium is connected to the interface. The job setting acquisition portion acquires from the external storage medium the job setting associated with the identification information accepted by the specific information acceptance portion. The control portion executes a job indicated by the job setting acquired by the job setting acquisition portion.

DETAILED DESCRIPTION

Figure 1:
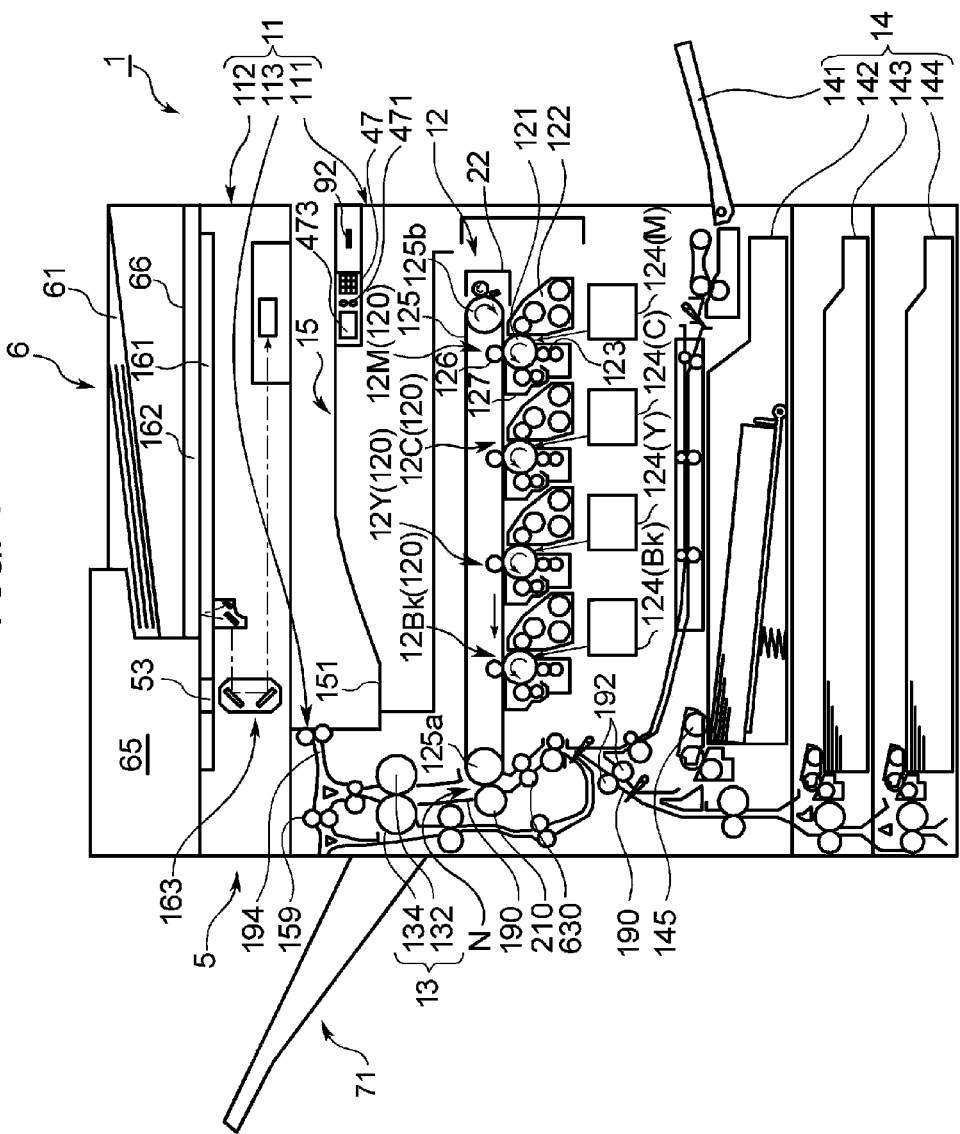
FIG. 1 is a front cross-sectional view illustrating a structure of an image forming apparatus according to an embodiment of the present disclosure.

An image forming apparatus according to an embodiment of the present disclosure is described hereinafter with reference to the drawings. FIG. 1 is a front cross-sectional view showing a structure of the image forming apparatus according to the embodiment of the present disclosure. An image forming apparatus 1 is a multifunction peripheral provided with a plurality of functions including a copy function, a printing function, a scanning function, and a facsimile function, for example. The image forming apparatus 1 includes, an image forming portion 12, a fusing device 13, a paper feeding portion 14, a paper discharging portion 15, a document feeding portion 6, and a document reading portion 5 and the like, each of which is installed in an apparatus main body 11.

The apparatus main body 11 is provided with a lower main body 111, an upper main body 112 disposed upward opposite to the lower main body 111, and a connecting portion 113 provided between the upper main body 112 and the lower main body 111. The connecting portion 113 is a structure for connecting the lower main body 111 and the upper main body 112, while providing the paper discharging portion 15 therebetween. The connecting portion 113 stands upright at a left portion and a rear portion of the lower main body 111, forming an L-shape in a plan view. The upper main body 112 is supported at an upper end portion of the connecting portion 113. The upper main body 112 is provided with the document reading portion 5 and the document feeding portion 6.

On a front part of the image forming apparatus 1, an operation portion 47 is provided through which a user enters an operational instruction. The operation portion 47 is provided with a display portion 473 composed of a Liquid Crystal Display (LCD) and the like.

In addition, at the lower main body 111 of the image forming apparatus 1, a storage medium connection interface 92 is provided to which an external storage medium such as a USB memory is connectable. The storage medium connection interface 92 is connected to a control unit 10 (described later). The storage medium connection interface 92 is connected to the external storage medium such as a USB memory, for allowing data writing and data reading between the control unit 10 and the external storage medium.

The document reading portion 5 includes a platen glass (platen) 161, a document holding cover 162, and a reading mechanism 163. The platen glass 161 is installed in an upper opening of the upper main body 112 to place a document. The document holding cover 162 is configured to be openable and closable so as to hold a document placed on the platen glass 161. The reading mechanism 163 reads an image of the document placed on the platen glass 161. The reading mechanism 163 optically reads an image of the document, using an image sensor such as a charge coupled device (CCD), complementary metal oxide semiconductor (CMOS), and generates image data.

The document feeding portion 6 includes a document mount 61 on which the document is placed, a document discharging portion 66 that discharges the document after image reading, and a document conveying mechanism 65. The document conveying mechanism 65 includes a paper feeding roller, a conveyance roller, and a paper turning-over mechanism, each of which is not illustrated. The document conveying mechanism 65 drives the paper feeding roller and the conveyance roller to feed documents placed on the document mount 61 one by one, and conveys a document to a position facing a document reading slit 53. After allowing the reading mechanism 163 to read the document through the document reading slit 53, the document conveying mechanism 65 discharges the document to the document discharging portion 66. As a result of the paper turning-over mechanism turning over and conveying the document again to the position facing the document reading slit 53, the document conveying mechanism 65 allows the reading mechanism 163 to scan images of both faces of the document via the document reading slit 53.

The document feeding portion 6 is pivotal with respect to the upper main body 112, such that a front side of the feeding portion 6 is movable upward. By moving the front side of the document feeding portion 6 upward to make an upper face of the platen glass 161 open, it is possible for a user to place a document to be read, for example a spread book, onto the upper face of the platen glass 161.

Inside the lower main body 111, the image forming portion 12, the fusing device 13 and the paper feeding portion 14 are provided. The upper main body 112 is provided with the document reading portion 5. The paper feeding portion 14 includes paper feeding cassettes 142, 143 and 144, which are insertable and removable with respect to the apparatus main body 11. The paper feeding cassettes 142, 143 and 144 respectively store stacked sheets of printing paper (an example of recording medium).

The image forming portion 12 performs forming of a toner image on a sheet of printing paper fed from the paper feeding portion 14. The image forming portion 12 includes an image forming unit 120, an intermediate transfer belt 125, and a secondary transfer roller 210. The image forming unit 120 includes a magenta image forming unit 12M using a magenta toner, a cyan image forming unit 12C using a cyan toner, an yellow image forming unit 12Y using an yellow toner, and a black image forming unit 12Bk using a black toner, which are sequentially arranged from upstream to downstream in a running direction of the intermediate transfer belt 125. In a case in which these image forming portions are described without being discriminated from each other, each of the image forming portions is referred to as "image forming unit 120". The intermediate transfer belt 125 is stretched around a plurality of rollers such as a driving roller 125a (opposing roller for secondary transfer), so as to be endlessly rotatable in a sub scanning direction of image forming. The secondary transfer roller 210 is in contact with an outer peripheral surface of the intermediate transfer belt 125, which is on the driving roller 125a.

Each of the image forming units 120 integrally includes a photoreceptor drum 121, a developing device 122 that supplies toner to the photoreceptor drum 121, a toner cartridge that stores toner (not illustrated), a charging device 123, an exposure device 124, a primary transfer roller 126, and a drum cleaning device 127.

The photoreceptor drum 121 forms an electrostatic latent image and a toner image based thereon, on a peripheral surface thereof. The developing device 122 supplies toner to the photoreceptor drum 121. The toner is supplied to the developing device 122 as necessary from the toner cartridge.

The charging device 123 is provided immediately below the photoreceptor drum 121. The charging device 123 uniformly charges the peripheral surface of the photoreceptor drum 121.

The exposure device 124 is provided below the photoreceptor drum 121, and further below the charging device 123. The exposure device 124 irradiates the peripheral surface of the photoreceptor drum 121 with laser light corresponding to image data entered by a computer or the like or image data acquired by the document reading portion 5, and forms an electrostatic latent image on the peripheral surface of the photoreceptor drum 121.

The development device 122 supplies the toner and deposits it on the electrostatic latent image on the peripheral surface of the photoreceptor drum 121 rotating in a direction of arrows shown in FIG. 1. Accordingly, the development device 122 forms a toner image corresponding to the image data on the peripheral surface of the photoreceptor drum 121.

The intermediate transfer belt 125 is disposed above each photoreceptor drum 121. The intermediate transfer belt 125 is stretched to be endlessly rotatable around the driving roller 125a on the left side of FIG. 1 and a driven roller 125b on the right side of FIG. 1. A downward portion of an outer peripheral face of the intermediate transfer belt 125 is in contact with a peripheral surface of each photoreceptor drum 121.

A primary transfer roller 126 is provided opposite to each of the photoreceptor drums 121 across the intermediate transfer belt 125. A transfer bias is applied to the primary transfer roller 126 by a transfer bias application portion (not illustrated). The primary transfer roller 126 transfers the toner image formed on the outer peripheral surface of the photoreceptor drum 121 to the surface of the intermediate transfer belt 125.

A control portion 100 (see FIG. 2) controls driving of a primary transfer roller 126 and an image forming unit 120 for each color. The control portion 100 performs transfer of a magenta toner image formed by the magenta image forming unit 12M, a cyan toner image formed by the cyan image forming unit 12C, a yellow toner image formed by the yellow image forming unit 12Y, and a black toner image formed by the black image forming unit 12Bk, in this order such that the toner images of respective colors overlap on the surface of the intermediate transfer belt 125. Accordingly, full-color toner image is formed on the surface of the intermediate transfer belt 125 (intermediate transfer (primary transfer)).

A transfer bias is applied to the secondary transfer roller 210 by a transfer bias application portion (not illustrated). The secondary transfer roller 210 transfers the full-color toner image formed on the surface of the intermediate transfer belt 125 onto a sheet of printing paper conveyed from the paper feeding portion 14. The secondary transfer roller 210 is provided at a paper path 190 in contact with the outer peripheral surface of the intermediate transfer belt 125, which is on the driving roller 125a. A nip portion N where the toner image is secondarily transferred to the sheet of printing paper is formed between the secondary transfer roller 210 and the driving roller 125a across the intermediate transfer belt 125. The sheet of printing paper being conveyed in the paper path 190 is pressed and interposed by the intermediate transfer belt 125 and the secondary transfer roller 210 at the nip portion N. Here, the toner image on the intermediate transfer belt 125 is secondarily transferred to the sheet of printing paper. A registration roller 630 is disposed more upstream in a paper conveying direction of a conveyance roller 192 than the nip portion N between the secondary transfer roller 210 and the driving roller 125a.

A drum cleaning device 127 is provided on a left side of each of the photoreceptor drums 121 in FIG. 1, and cleans the photoreceptor drum 121 by removing residual toner on the peripheral surface thereof. The peripheral surface of the photoreceptor drum 121 cleaned by the drum cleaning device 127 is directed toward the charging device 123 again for a next charging process.

The paper path 190 extending in a vertical direction is formed on a left side of the image forming portion 12 in FIG. 1. A feeding roller 192 is provided at an appropriate position in the paper path 190. The feeding roller 192 conveys a sheet of printing paper fed from the paper feeding portion 14 toward the nip portion N and the fusing device 13. In other words, a conveying mechanism including the feeding roller 192 disposed at the appropriate position conveys the sheet of printing paper.

The fusing device 13 is provided with a heating roller 132 internally having an electric heating element of a heating source and a pressing roller 134 disposed opposite to the heating roller 132. On the toner image transferred onto the printing paper by the image forming portion, the fusing device 13 performs a fusing process by heat from the heating roller 132 while sheet of printing paper passes through a fusing nip portion between the heating roller 132 and the pressing roller 134. The sheet of printing paper which has finished the fusing process to have a color image is discharged to a discharging tray 151 provided at a top portion of the lower main body 111, through a discharging paper path 194 extending from an upper portion of the fusing device 13.

The cleaning portion 22 is provided at a position facing the outer peripheral surface of the intermediate transfer belt 125 which is on the driven roller 125b.

The paper feeding portion 14 includes a manual feeding tray 141 and paper feeding cassettes 142, 143 and 144. The manual feeding tray 141 is openably and closably provided at a wall on the right side of the apparatus main body 11 as shown in FIG. 1. The paper feeding cassettes 142, 143 and 144 are insertably and removably installed below the exposure device 124 in the lower main body 111.

The manual feeding tray 141 is provided at a lower position on a right face of the lower main body 111 and used for manually feeding a sheet of printing paper to the image forming portion 12. The paper feeding cassettes 142, 143 and 144 store stacked sheets of printing paper. A pickup roller 145 is provided above the paper feeding cassette 142. The pickup roller 145 feeds a topmost sheet of the stacked sheets of printing paper stored in the paper feeding cassettes 142, 143 and 144 toward the paper path 190.

The paper discharging portion 15 is formed between the lower main body 111 and the upper main body 112. The paper discharging portion 15 includes the discharging tray 151 formed on an upper face of the lower main body 111. A sheet of printing paper on which a toner image is formed by the image forming portion 12 and fused by the fusing device 13 is discharged to the discharging tray 151.

Figure 2:
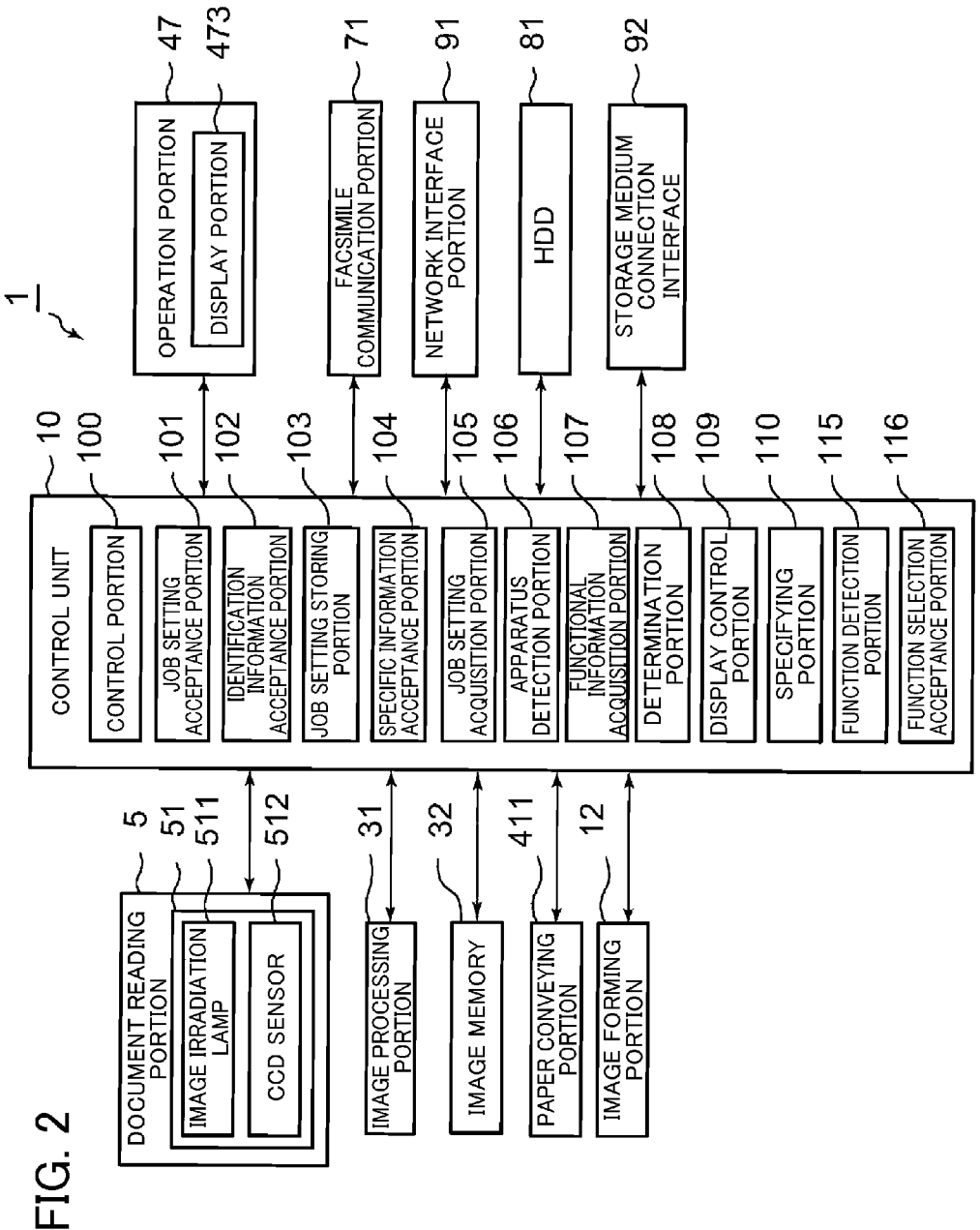
FIG. 2 is a functional block diagram schematically illustrating a main internal setup of the image forming apparatus.

Next, an electric setup of the image forming apparatus 1 is described hereinafter. FIG. 2 is a functional block diagram schematically illustrating a main internal setup of the image forming apparatus 1.

The image forming apparatus 1 includes the control unit 10. The control unit 10 is composed of a Central Processing Portion (CPU), RAM, ROM, a dedicated hardware circuit, and the like, and controls overall operation of the image forming apparatus 1.

The control unit 10 is connected to the document reading portion 5, an image processing portion 31, an image memory 32, a paper feeding portion 411, the image forming portion 12, the operation portion 47, the facsimile communication portion 71, a network interface portion 91, a Hard Disk Drive (HDD) 81, and the like. The control unit 10 controls operation of the above-described electrically connected portions and performs transmission or reception of signals or data with these portions.

The control unit 10 includes a control portion 100 that performs control of an entire operation of the image forming apparatus 1. The control portion 100 controls operations and processing of portions required for controlling functions such as a scanning function, copy function, printing function, and facsimile function, according to an instruction of job execution entered by a user through the operation portion 47, a personal computer connected via a network, or the like.

The document reading portion 5 includes a scanning portion 51. The scanning portion 51 is composed of the above-described reading mechanism 163 including an image irradiation lamp 511 and a Charge Coupled Device (CCD) sensor 512. The document reading portion 5 reads an image from a document by receiving the light reflected off the document by the CCD sensor 512, which is emitted by the image irradiation lamp 511.

The image processing portion 31 performs as necessary processing of image data of the image read by the document reading portion 5. For example, the image processing portion 31 performs preset image processing in order to improve quality of an image read by the document reading portion 5 and subjected to image formation performed by the image forming portion 12.

The image memory 32 stores image data read by the document reading portion 5 and the like.

The paper feeding portion 411 is composed of the pickup roller 145, the feeding roller 192 and the like illustrated in FIG. 1. It conveys a sheet of printing paper stored in the paper feeding cassettes 142, 143 and 144 to the image forming portion 12 and the discharging tray 151.

The image forming portion 12 includes, as described above, the image forming units 12M, 12C, 12Y, 12Bk, the intermediate transfer belt 125 stretched around the driving roller 125a, and the secondary transfer roller 210. The image data to be delivered by the image forming portion 12 are, image data read by the document reading portion 5, image data transmitted via the network interface portion 91 from a client computer within a local area, and the like.

The operation portion 47 includes a touch panel portion and an operation key portion, as shown in FIGS. 1 and 2. The touch panel portion and the operation key portion accept an instruction from a user relating to various operations and processes executable by the image forming apparatus 1. The touch panel portion is located in a display area of the display portion 473 such as a Liquid Crystal Display (LCD) provided at the operation portion 47.

The facsimile communication portion 71 includes an encoding/decoding portion, a modulation/demodulation portion, and a Network Control Portion (NCU), each of which is not illustrated. The facsimile communication portion 71 transmits a facsimile via a public telephone network. The facsimile communication portion 71 transmits the image data of a document read by the document reading portion 5 to a facsimile device and the like via a telephone line, and receives image data transmitted by a facsimile device and the like.

The HDD 81 stores the image data and the like read by the document reading portion 5. The image data stored in the HDD 81 is used for image formation performed by the image forming portion 12 and may be transmitted to a client computer connected to the image forming apparatus 1 via a network.

The network interface portion 91 is composed of a communication module such as an LAN board, and transmits and receives various data with respect to apparatuses (an image forming apparatus, a personal computer and the like) within a local area, via the LAN and the like connected to the network interface portion 91.

As described above, the storage medium connection interface 92 connects the external storage medium such as a USB memory with the control unit 10 so as to allow data transmission and reception therebetween. An example in which a USB memory as the external storage medium and a USB interface as the storage medium connection interface 92 is described hereinafter. A job setting storing portion 103 (described later) writes and stores a job setting indicating a job executed by the image forming apparatus 1 into the USB memory connected to the storage medium connection interface 92. In addition, a job setting stored in the USB memory is read by a job setting acquisition portion 105 (described later) from the USB memory connected to the storage medium connection interface 92.

The control unit 10 further includes, a job setting acceptance portion 101; an identification information acceptance portion 102, a job setting storing portion 103, an specific information acceptance portion 104, a job setting acquisition portion 105, an apparatus detection portion 106, a functional information acquisition portion 107, a determination portion 108, a display control portion 109, an specifying portion 110, a function detection portion 115, and a function selection acceptance portion 116. The control unit 10 functions as these portions as the CPU operates according to programs stored in memory or ROM in the control unit 10, in the HDD 81, or the like. Alternatively, it may be that the control unit 10 is provided with dedicated hardware circuits or the like corresponding the portions and performs the functions of the portions. It may alternatively be possible that the control portion 100 is configured to concurrently serve as the display control portion 109.

In addition, it may be that the image forming apparatus 1 includes portions as far as necessary in the embodiments described later such as, the apparatus detection portion 106, the functional information acquisition portion 107, the determination portion 108, the display control portion 109, the specifying portion 110, the function detection portion 115, and the function selection acceptance portion 116.

The job setting acceptance portion 101 accepts a job setting associated with each function possessed by the image forming apparatus 1, according to an instruction given by a user. Each function includes, for example, a copy operation, a scanning operation, a facsimile operation, a printing operation, data storing, data transmission and the like. When a user enters a job setting as to an operation of storing image data read by the scanning operation, the following processes are executed in response to an input of a value for each item via the operation portion 47. The value is not limited to a numerical value, but includes setting item and the like. Each item includes, for example, zooming, centering, border erasing, continuous reading, file format, document name and the like. The job setting acceptance portion 101 accepts the values thus entered and stores a combination of the values as a job setting for an operation of storing the data. In addition, when a job for copy operation is set, the following processes are executed in response to an input of a value for each item with respect to resolution of reading a document and setting for printing an image of the document given by the user via the operation portion 47. Each item includes, for example, duplex/single printing, document size, number of copies, sorting, aggregation, resolution, color/monochromatic printing, border erasing, zooming and the like. The job setting acceptance portion 101 accepts the entered values and stores a combination of the values as a job setting for copy operation.

The control portion 100 executes a job indicated by the job setting accepted by the job setting acceptance portion 101. The control portion 100 controls operation of each portion of the image forming apparatus 1, according to a value of each item constituting the accepted job setting.

The identification information acceptance portion 102 accepts from a user an input of identification information associated with a job setting to be stored in the USB memory connected to the storage medium connection interface 92. This identification information is, for example, 11-digit alphanumeric characters, symbols and the like. Descriptions will be given based on an example of this identification information.

The job setting storing portion 103 associates the identification information accepted by the identification information acceptance portion 102 with the job setting of a job executed by the control portion 100. In addition, the job setting storing portion 103 causes the job setting and the identification information to be stored in the USB memory connected to the storage medium connection interface 92.

The specific information acceptance portion 104 accepts an input of identification information, such that a job setting to be read from the USB memory connected to the storage medium connection interface 92 is specified. It may be alternatively possible that the identification information acceptance portion 102 concurrently serves as the specific information acceptance portion 104.

The job setting acquisition portion 105 reads to acquire the job setting associated with the identification information accepted by the specific information acceptance portion 104 from the USB memory connected to the storage medium connection interface 92.

The apparatus detection portion 106 detects other image forming apparatuses connected to the image forming apparatus 1 via a network. For example, the apparatus detection portion 106 acquires an IP address of another image forming apparatus when it is connected to the network such as a Local Area Network (LAN) to which the image forming apparatus 1 is connected. The apparatus detection portion 106 uses the IP address to detect another image forming apparatus connected to the image forming apparatus 1 via the network, when the job setting storing portion 103 stores a job setting.

The functional information acquisition portion 107 acquires functional information, which indicates executable functions performed by another image forming apparatus, from another image forming apparatus within the network detected by the apparatus detection portion 106. For example, the functional information acquisition portion 107 requests another image forming apparatus within the network to transmit various setting information stored therein and receives the setting information from another image forming apparatus. Accordingly, the functional information acquisition portion 107 acquires functional information about functions executable by another image forming apparatus. The various setting information includes, for example, availability of full-color printing and duplex scanning, and whether a finisher is provided. Alternatively, it may be that the functional information indicating the functions executable by another image forming apparatus is acquired in such a manner as: A user or a maintenance personnel enters another image forming apparatus connected via the network and the executable functional information via the operation portion 47. The functional information acquisition portion 107 stores the entered apparatus information and functional information.

The determination portion 108 determines whether the job indicated by the job setting to be stored is executable by another image forming apparatus based on the functional information acquired by the functional information acquisition portion 107, when the job setting storing portion 103 stores the job setting.

The display control portion 109 controls a display of the display portion 473. For example, it causes the display portion 473 to display a result of the determination by the determination portion 108 for each of the other image forming apparatuses.

The specifying portion 110 specifies an inexecutable item among items constituting the job setting to be stored by the job setting storing portion 103 based on the functional information corresponding to another image forming apparatus, for a case where the determination portion 108 determines that the job indicated by the job setting is inexecutable by another image forming apparatus.

The function detection portion 115 reads a job setting stored in the USB memory connected to the storage medium connection interface 92, analyzes the job setting, and detects a function to which the job setting is applied from the job setting. The function includes, for example, a copy operation, a scanning operation, a facsimile operation, a printing operation, data storing, data transmission and the like. In other words, the function detection portion 115 detects to which function the job setting stored in the USB memory is assigned among the abovementioned functions such as the copy operation.

The function selection acceptance portion 116 accepts selection of a function detected by the function detection portion 115 based on an instruction entered by a user through the operating portion 47 and the like.

Figure 3:
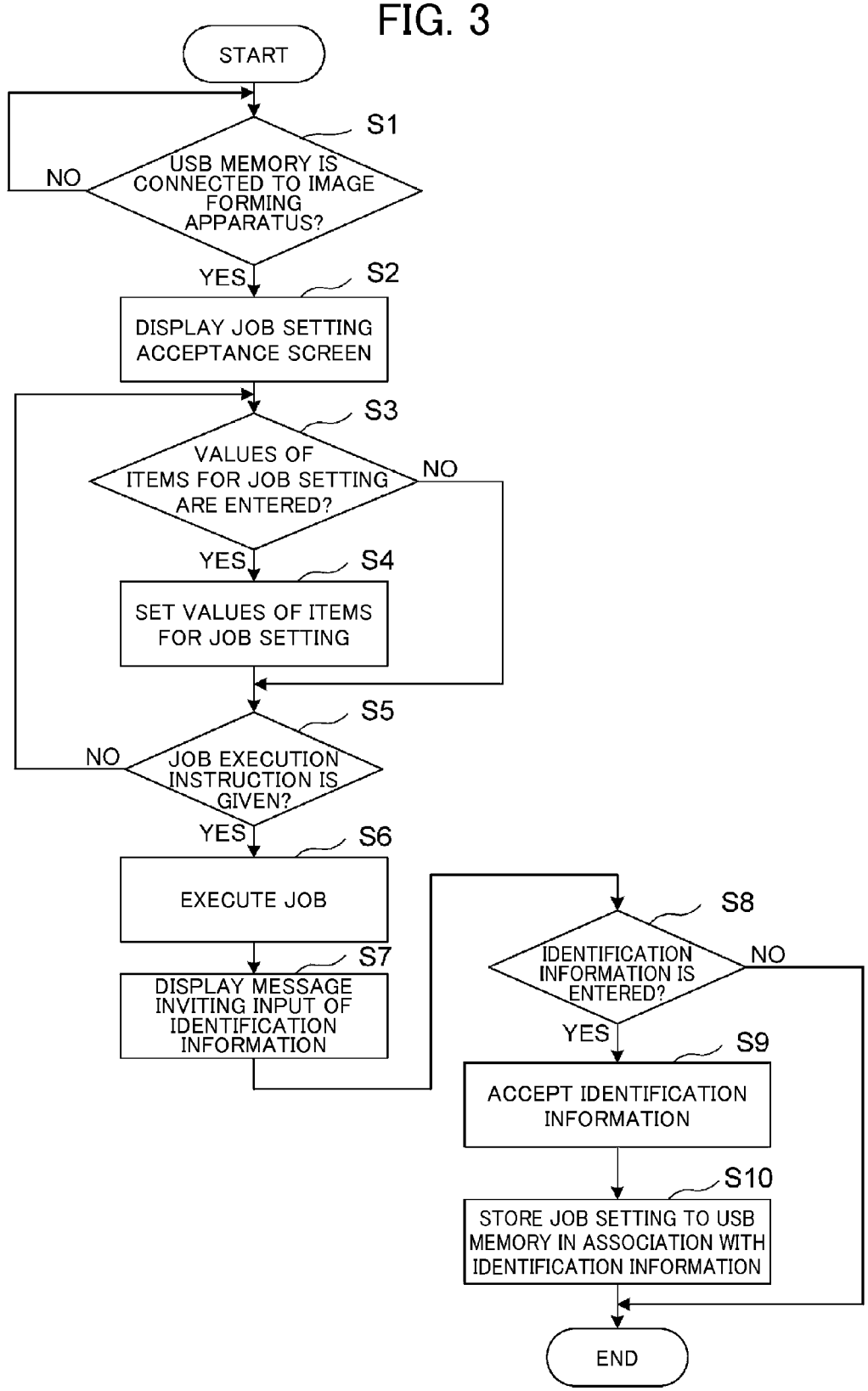
FIG. 3 is a flow chart showing a first embodiment of processing to store a job setting in an external storage medium performed by the image forming apparatus.
Figure 4A:
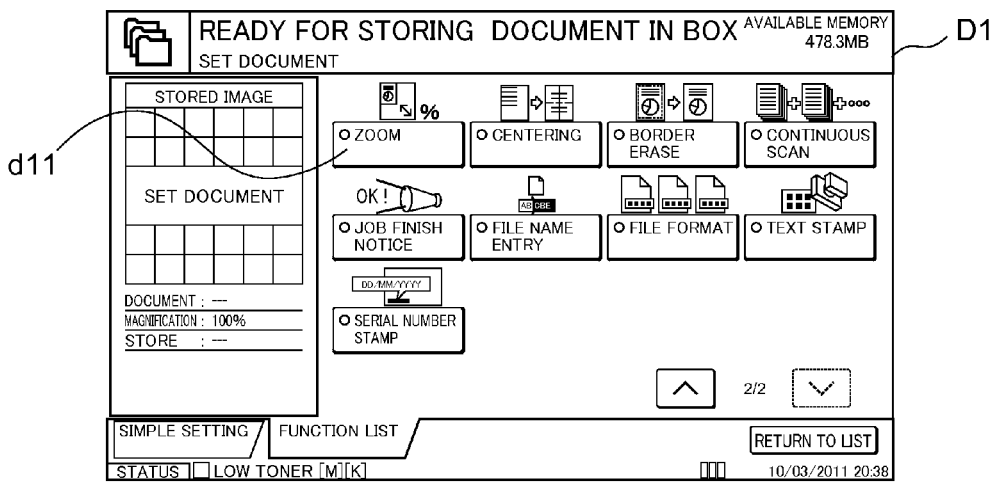
FIGS. 4A and 4B are diagrams illustrating examples of a display screen of a display portion.
Figure 4B:
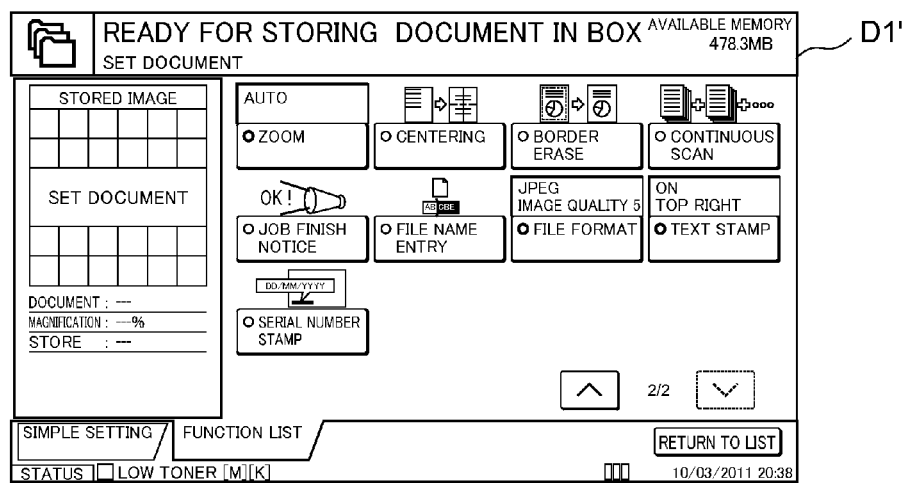
Figure 5:
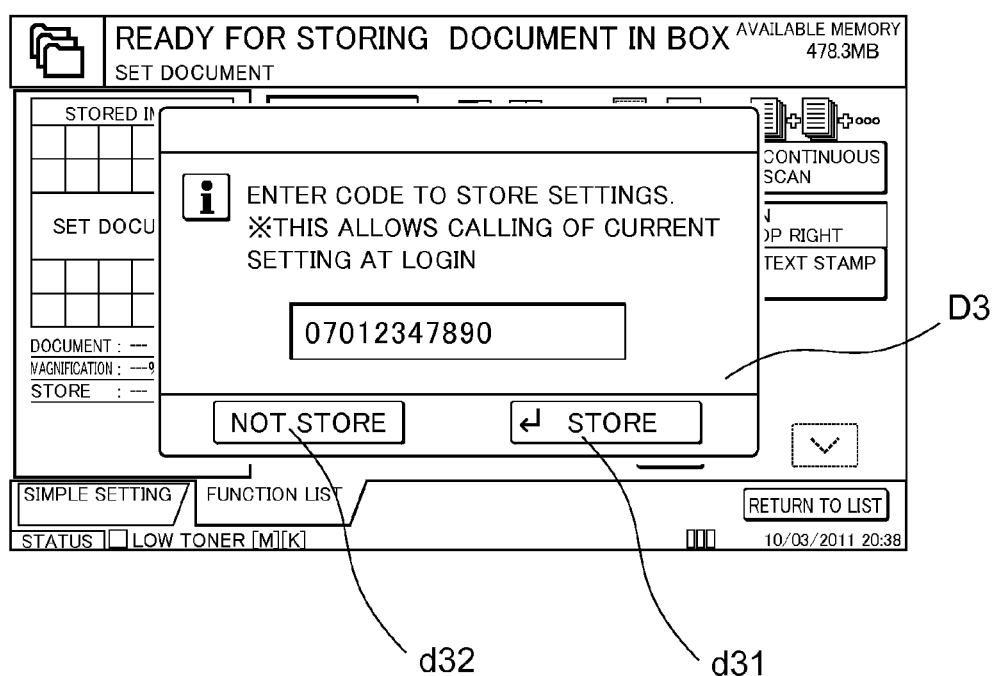
FIG. 5 is a diagram illustrating an example of a display screen of the display portion.

Next, a first embodiment of a process of storing a job setting in an external storage medium performed by the image forming apparatus 1 is described hereinafter. FIG. 3 is a flow chart showing a first embodiment of a process storing a job setting in an external storage medium by the image forming apparatus 1. FIGS. 4A, 4B and 5 are diagrams illustrating examples of a display screen of the display portion 473. In the display screen illustrated in the drawings, the identification information is referred to as a "code".

The image forming apparatus 1 executes a storing process of a job setting while standing ready for various operations such as the copy operation, if the control portion 100 detects connection of the USB memory to the storage medium connection interface 92 (Step S1, YES).

While the image forming apparatus 1 stands ready for various operations such as the copy operation, the display control portion 109 causes the display portion 473 to display a job setting acceptance screen for accepting each item constituting the job setting (Step S2). In the present embodiment, an example is described, which relates to a job of storing image data acquired by the scanning operation in a HDD built in the image forming apparatus 1. In the description hereinafter, storing a document in the HDD by the scanning operation is referred to as "storing document in box". In this case, as shown in FIG. 4A, the display control portion 109 causes the display portion 473 to display a job setting acceptance screen D1 for storing a document in a box.

If a user enters values for respective items constituting the job at the moment of storing a document in a box according to a guidance displayed on the job setting acceptance screen D1 (Step S3, YES), while the job setting acceptance screen D1 is displayed on the display portion 473, the following processes are executed. The items include, for example, zooming, centering, border erasing, continuous reading, file format, document name and the like. The job setting acceptance portion 101 accepts the entered values and stores a combination of the values for the respective items as the job setting for storing a document in a box (Step S4). It should be noted that the job setting acceptance portion 101 stores a default value for an item to which no value is entered by the user.

In this connection, if a user does not enter values for respective items constituting the job setting (Step S3, NO), while the job setting acceptance screen D1 is displayed on the display portion 473, storage processing of a job setting in Step S4 is not executed. In this case, the job setting acceptance portion 101 stores default values for all the items constituting the job setting.

For example, if the user touches a ZOOM button d11 displayed on the job setting acceptance screen D1, an instruction of specifying a reduction/magnification ratio for a read image acquired by the scanning operation is entered in the operation portion 47 through a touch screen portion of the display portion 473. In response to the instruction, the display control portion 109 causes the display portion 473 to display a display screen (not illustrated) for accepting an input of a reduction/magnification ratio. While the display screen is displayed, if the user operates input buttons displayed on the display screen to enter a value for the reduction/magnification ratio, the job setting acceptance portion 101 accepts the entered value. After entering the value, as shown in FIG. 4B, the display control portion 109 causes the display portion 473 to display again the job setting acceptance screen D1', including the entered value thus input. The job setting acceptance screen D1' shows a state in which "Auto" is entered, where the reduction/magnification ratio is automatically set according to a document size and a printing paper size.

Thereafter, processes of Steps S3 and S4 are repeated until an instruction for executing the job setting specified by the values of items as described above is entered by a user such as pressing a START button 471 of the operation portion (Step S5, NO). In other words, it is possible for the user to repeatedly enter a value for each item of the job, unless the user presses the START button 471.

For other items constituting the job setting, the user enters specific values in a similar operation to that of setting the reduction/magnification ratio. The job setting acceptance screen D1' shows a state in which "JPEG" and "Quality Level 5" (indicating resolution) are entered for a file format, and an indication of "Top Right" in an image forming area is entered for a text stamp. The text stamp represents a process for adding a predetermined image to an image to be formed on a sheet of printing paper.

When the user presses the START button 471 of the operation portion 47 to enter an instruction for executing a job with the job setting with the values for respective items (Step S5, YES), the following processes are executed. More specifically, the control portion 100 controls each portion of the image forming apparatus 1 to execute the job according to the values of respective items constituting the job setting (Step S6). For example, the control portion 100 causes the document reading portion 5 to read a stack of documents placed on the document mount 61 with the specified resolution (image quality), for a case where the control portion 100 executes the job setting for storing a document in a box as described above as an example. In addition, the control portion 100 causes the image processing portion 31 to execute a process of adding the predetermined image to the read image acquired by reading and storing the image in a JPEG file format. Furthermore, the control portion 100 causes the image processing portion 31 to perform a process of reducing the read image to fit the specified printing paper size. Furthermore, the control portion 100 causes the image data generated by a series of processes to be stored in the HDD built in the image forming apparatus 1.

After executing the above-described job, the display control portion 109 causes the display portion 473 to display a message inviting the user to enter the identification information (identification code) (Step S7). The identification information individually identifies and specifies a job setting to be stored, and is used as a pass code for reading the job setting from the USB memory. For example, the display control portion 109 causes the display portion 473 to display the identification information input screen D3, as exemplified in FIG. 5.

The process of Step S1 (the control portion 100 detecting connection of the USB memory to the storage medium connection interface 92) may be performed after Step S7.

While the display control portion 109 displays the above-mentioned message on the display portion 473, if the user operates numerical keys and the like in the operation portion to enter the identification information (Step S8, YES), the identification information acceptance portion 102 accepts the input of the identification information (Step S9). Subsequently, the job setting storing portion 103 associates the accepted identification information with the job setting made in Step S6, and stores the identification information and the job setting in the USB memory connected to the storage medium connection interface 92 (Step S10). For example, if the user touches a STORE button d31 displayed on the identification information input screen D3 while the identification information input screen D3 is displayed, the entered identification information is accepted by the identification information acceptance portion 102 through the touch screen portion of the display portion 473.

On the other hand, if the user does not enter the identification information (Step S8, NO) while the identification information input screen D3 is displayed, the job setting storing portion 103 does not perform a process for storing the identification information and the job setting. The flow terminates. For example, if the user touches a NOT STORE button d32 displayed on the identification information input screen D3 while the identification information input screen D3 is displayed, the touch screen portion detects touching. Accordingly, the flow terminates without executing a process for storing the identification information and the job setting.

Figure 6:
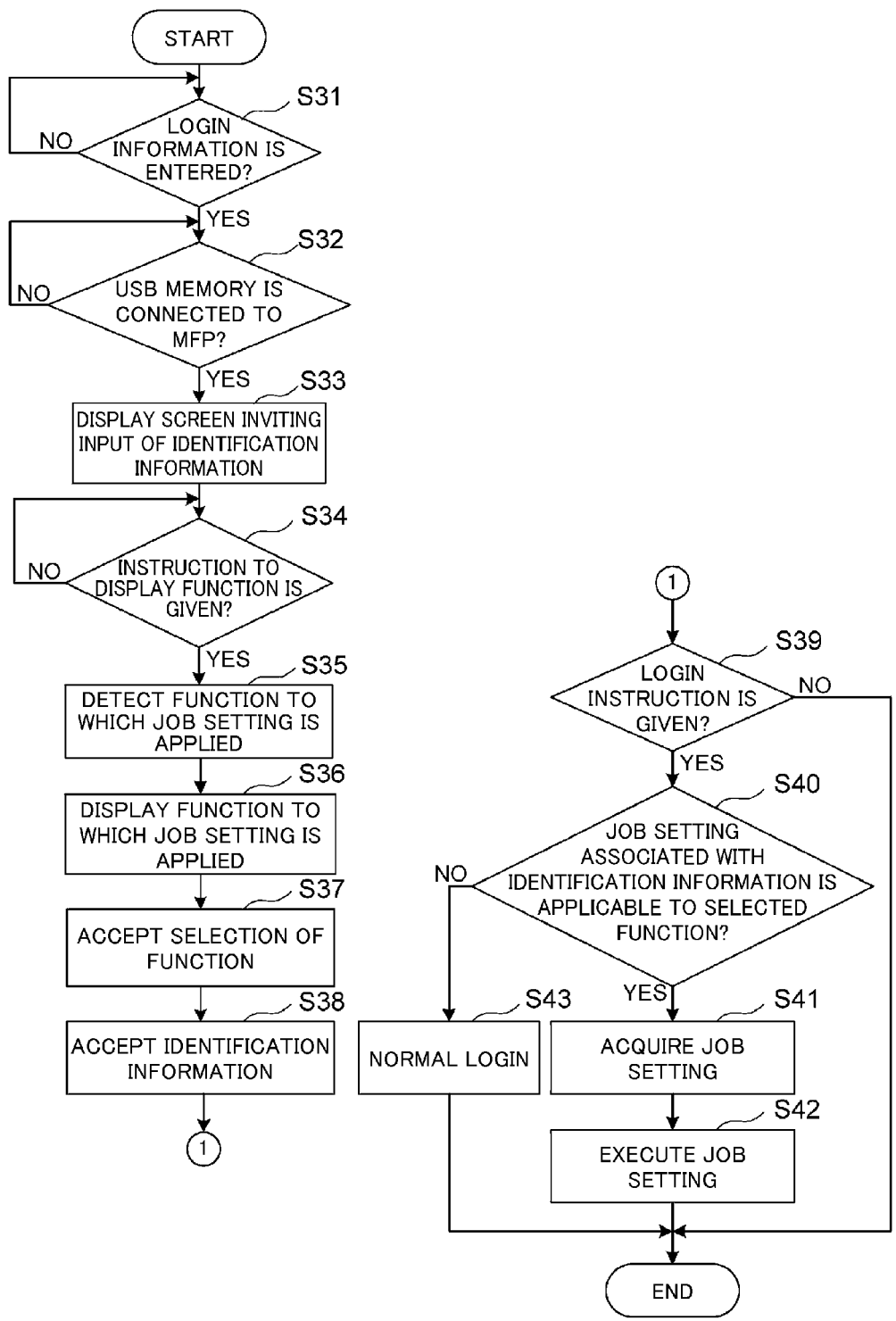
FIG. 6 is a flow chart showing processing to acquire a job setting from the external storage medium and to execute the job setting performed by the image forming apparatus.

Next, a process is described, in which the image forming apparatus 1 acquires a job setting from the external storage medium and executes the job setting. FIG. 6 is a flow chart showing a process in which the image forming apparatus 1 acquires a job setting from the external storage medium and executes the job setting. FIGS. 7A to 9 are diagrams illustrating examples of a display screen of the display portion 473. In the display screen illustrated in the drawings, the identification information is referred to as a "code".

Figure 7A:
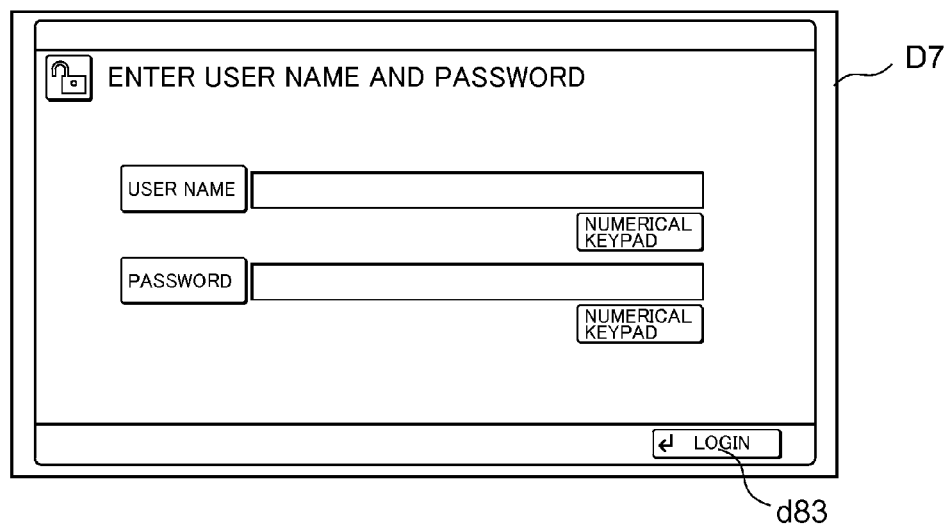
FIGS. 7A and 7B are diagrams illustrating examples of a display screen of the display portion.
Figure 7B:
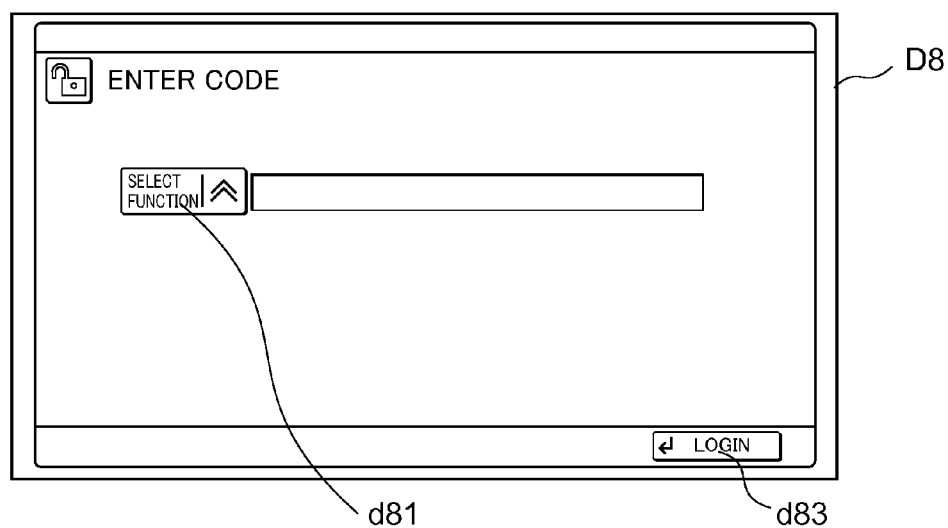

After the image forming apparatus is powered on, the display control portion 109 causes a login screen D7 as exemplified in FIG. 7A to be displayed. If login information including an ID (identification) and a password, which are unique identification information with respect to a user, is entered into the operation portion 47 (Step S31, YES) by the user, through the operating portion 47 or a numerical key screen (not illustrated) displayed in response to touching of a NUMERICAL KEY button d91 on the login screen D7 while the login screen D7 is displayed, the following processes are executed. More specifically, the control portion 100 determines whether the USB memory is connected to the storage medium connection interface 92 (Step S32). If the user does not enter the login information, the execution of processes from Step S32 onward is suspended until the login information is entered.

Here, if the control portion 100 determines that the USB memory is connected to the storage medium connection interface (Step S32, YES), the following processes are executed. More specifically, the display control portion 109 causes the display portion 473 to display a message for inviting the user to input the identification information, for example an identification information input screen D8 as exemplified in FIG. 7B (Step S33). The display control portion 109 causes a FUNCTION SELECTION button d81 to be displayed along with the message described above on the identification information input screen D8. The FUNCTION SELECTION button d81 accepts a function display instruction from a user an instruction indicating to which function (copy operation, scanning operation, facsimile operation and the like) each job setting is applied, which is stored in the USB memory connected to the storage medium connection interface 92.

Here, if the function display instruction is entered by a user touching the FUNCTION SELECTION button d81, which is detected by the touch screen portion (Step S34, YES), the function detection portion 115 detects a function to which the job setting stored in the USB memory is applied (Step S35). For example, the function detection portion 115 reads all job settings stored in the USB memory, analyzes each of the job settings, and detects to which of the abovementioned functions a job setting is applied.

Figure 8A:
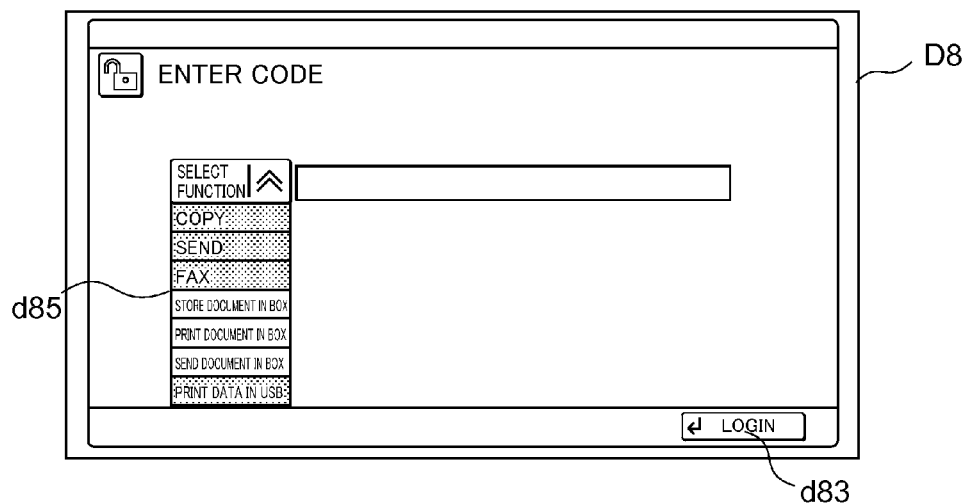
FIGS. 8A and 8B are diagrams illustrating examples of a display screen of the display portion.
Figure 8B:
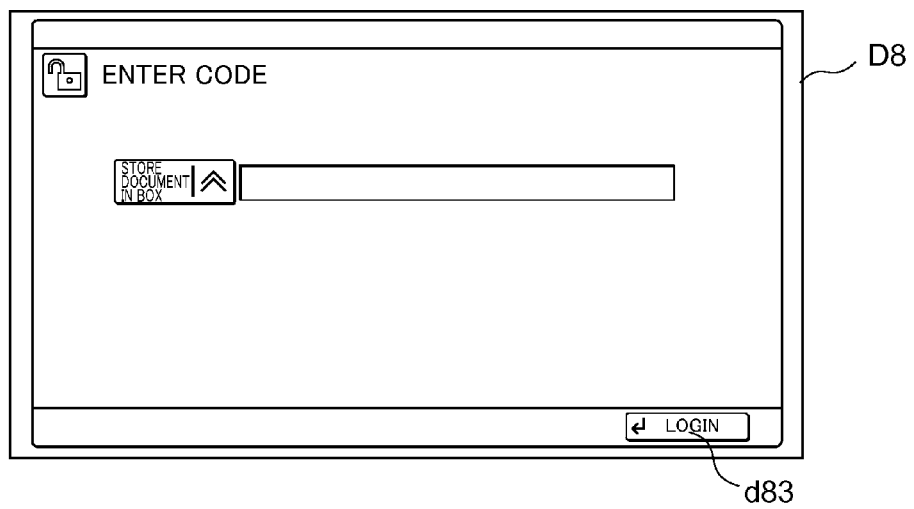
Figure 9:
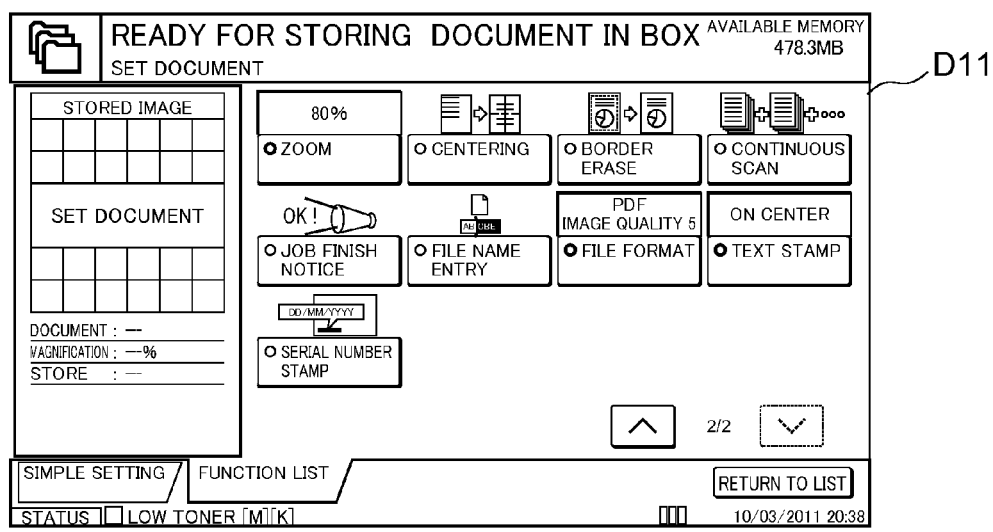
FIG. 9 is a diagram illustrating an example of a display screen of the display portion.

The display control portion 109 causes a result of the detection of a function to which each of the job settings is applied to be displayed (Step S36). For example, when a user touches the FUNCTION SELECTION button d81 on the identification information input screen D8 to enter the function display instruction, as exemplified in FIG. 8A, the display control portion 109 causes a list of the detected functions in a pull-down manner extending from the FUNCTION SELECTION button d81 to be displayed on the identification information input screen D8. An example shown in FIG. 8A shows a case where the job setting stored in the USB memory is applied to functions of box storing, box printing, and box transmission.

Here, if a user touches a function display portion indicating a function to which the job setting is applied, which the user intends to cause the image forming apparatus 1 to set among the functions displayed by the function display portion d85 in the pull-down manner, the instruction to select the function displayed at a position touched by the user via the touch screen portion is accepted by the function selection acceptance portion 116 (Step S37). After the acceptance, the display control portion 109 causes the selected function (for example, box storing) to be displayed in a display portion of the FUNCTION SELECTION button d81, as exemplified in FIG. 8B.

In addition, when the identification information for identifying a job setting to be read from the USB memory is entered by a user through operation of the numerical keys in the operation portion 47, the specific information acceptance portion 104 accepts the entered identification information (Step S38).

Here, when a login instruction is entered into the operation portion 47 through the touch screen portion that detects a user touch the LOGIN button d83 on the identification information input screen D8 (Step S39, YES), the following processes are executed. More specifically, the job setting acquisition portion 105 determines whether the job setting corresponding to the entered identification information matches the job setting applied to the function, of which selection by the user has been accepted in Step S37 (Step S40).

If the job setting acquisition portion 105 determines that the job setting corresponding to the entered identification information matches the job setting to be applied to the function selected in Step S37 (Step S40, YES), the job setting acquisition portion 105 reads out the job setting corresponding to the entered identification information from the USB memory (Step S41). The display control portion 109 causes a job setting acceptance screen D11 to be displayed and a value of each item for the acquired job setting to be displayed adjacent to a display portion for each item, as exemplified in FIG. 9.

Thereafter, when an execution instruction for the job is entered by the START button 471 of the operation portion 47 pressed by the user, the control portion 100 executes the job indicated by the job setting according to values of respective items constituting the job (Step S42).

If the job setting acquisition portion 105 determines that the job setting corresponding to the entered identification information does not match the job setting to be applied to the function selected in Step S37 (Step S40, NO), the job setting acquisition portion 105 does not read any job setting from the USB memory. In this case, the control portion 100 performs normal login and waits for an input of job setting by the user through the operation portion 47. In this case, the control portion 100 executes a job not based on a job setting acquired by the job setting acquisition portion 105 from the USB memory, but based on a job setting entered by the user through the operation portion 47.

The storing process and execution process for a job setting associate the identification information accepted by the identification information acceptance portion 102 from the user with the job setting and store them both, when the job setting storing portion 103 stores the job setting of a job executed by the image forming apparatus 1 in the USB memory. In addition, when the user causes the image forming apparatus 1 to read and execute the job indicated by the job setting stored in the USB memory, the job setting acceptance portion 105 acquires the job setting associated with the identification information entered by the user from the USB memory.

As a result, when the user causes the image forming apparatus 1 to execute the job indicated by the job setting stored in the USB memory, it is possible for the user to easily select a desired job setting to be acquired by the job setting acquisition portion 105 by indicating the identification information, even if a large number of job settings are stored in the USB memory. Accordingly, it will be easier for the user to select a job setting to be read by the image forming apparatus 1 from the USB memory.

In addition, even if the USB memory storing the job settings happens to be possessed by a third party, it is not possible for the third party to cause the job setting acquisition portion 105 to acquire the job settings from the USB memory unless the third party knows the identification information. Accordingly, it is possible to prevent the third party possessing the USB memory from causing the image forming apparatus 1 to execute the job settings without permission.

When a user causes the image forming apparatus 1 to execute a job setting stored in the USB memory, the user often selects the desired job setting based on a function to which the job setting is related among the copy function, scanning function, facsimile function and the like. For this reason, the job setting acquisition portion 105 according to the present embodiment acquires the job setting from the USB memory under a predetermined condition, so that the desired job setting among the job settings stored in the USB memory is executed by the image forming apparatus 1. The predetermined condition is that a job setting corresponding to identification information accepted by the specific information acceptance portion 104 is applicable to a function selected by a user. Accordingly, it may be possible to prevent the user from causing the image forming apparatus 1 to read a wrong job setting from the USB memory since specifying of a job setting based on an applicable function is added, although the user is likely to select a wrong job setting if the identification information is a sole input. Although the above-described effect is not implemented, it may alternatively be possible that the job setting acquisition portion 105 is configured to read from the USB memory the job setting corresponding to the identification information entered by the user, replacing the process of the job setting acquisition portion 105 reading a job setting from the USB memory (Step S40, YES; Step S41), on a condition that the job setting corresponding to the identification information entered by the user matches a function selected by the user.

Figure 10:
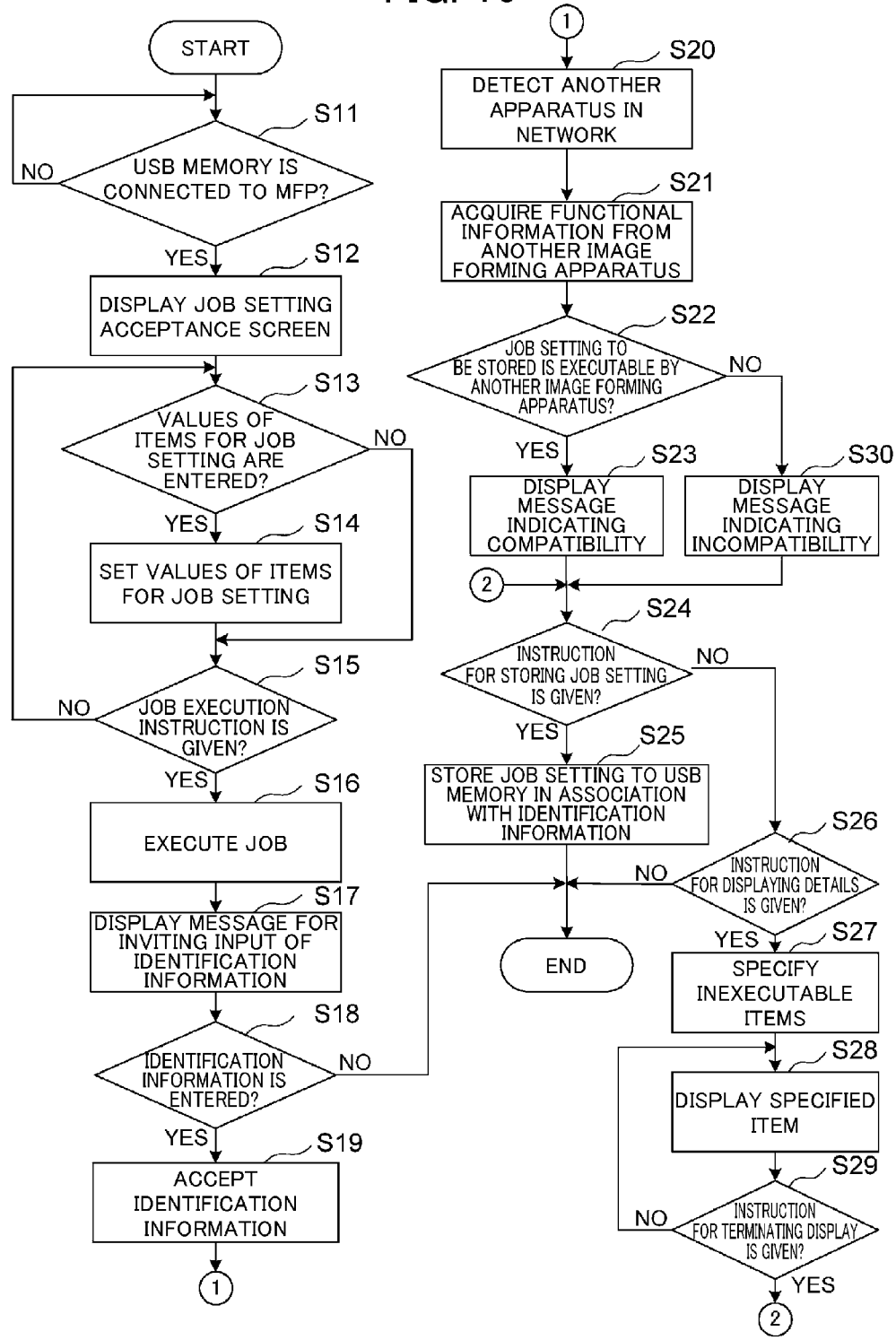
FIG. 10 is a flow chart showing a second embodiment of processing to store a job setting in an external storage medium performed by an image forming apparatus.
Figure 11:
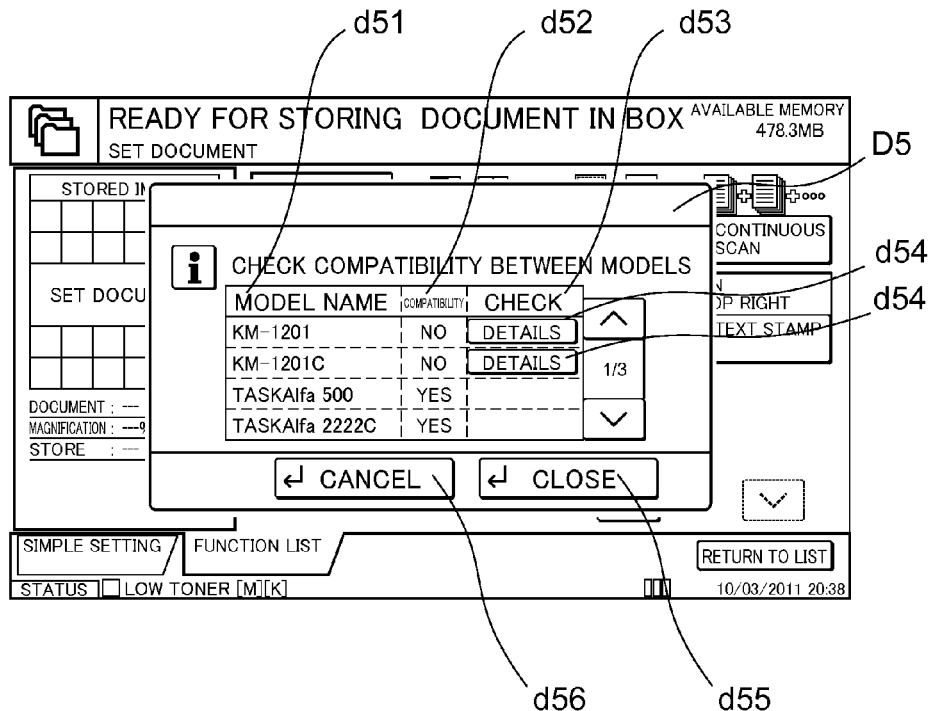
FIG. 11 is a diagram illustrating an example of a display screen of a display portion.
Figure 12:
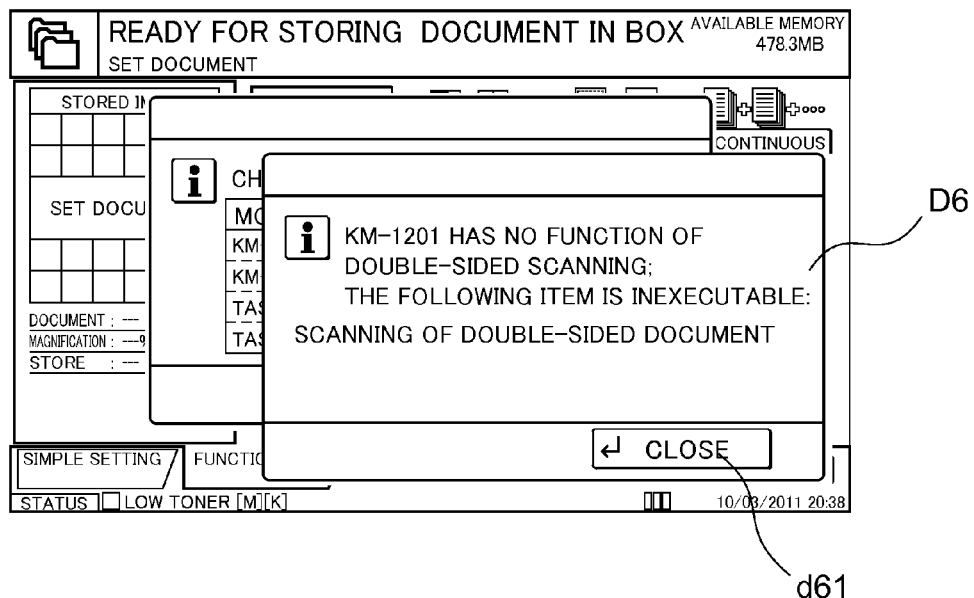
FIG. 12 is a diagram illustrating an example of a display screen of the display portion.

Next, a second embodiment of a process for storing a job setting in an external storage medium by an image forming apparatus 1 is described hereinafter. FIG. 10 is a flow chart showing the second embodiment of a process for storing a job setting in an external storage medium by the image forming apparatus 1. FIGS. 11 and 12 are diagrams illustrating examples of a display screen of a display portion 473. In the description of the second embodiment, description will be omitted for processes similar to those of the first embodiment.

In the second embodiment, an input of identification information associated with a job setting to be stored is accepted by an identification information acceptance portion 102 (Step S19) similarly to the first embodiment. Thereafter, an apparatus detection portion 106 detects another image forming apparatus connected through a network interface portion 91 to the image forming apparatus 1 via a network (Step S20). Subsequently, a functional information acquisition portion 107 requests detected another image forming apparatus to transmit functional information, and acquires the functional information indicating executable functions from another image forming apparatus. If a plurality of other image forming apparatuses is detected, the functional information acquisition portion 107 acquires the functional information from all other image forming apparatuses. If no other image forming apparatuses are detected, an acquiring process of the functional information in Step S21 does not take place.

After the acquisition of the functional information, a determination portion 108 determines whether a job indicated by a job setting to be stored is executable by detected another image forming apparatus or not based on the acquired functional information (Step S22).

As an example of the determination described above, there may be a case of a discrepancy between the functional information and the job setting. More specifically, the functional information of detected another image forming apparatus indicates a scanning operation that is capable of single-sided scanning but incapable of double-sided scanning. On the other hand, the job setting to be stored indicates storing a document in a box and double-sided scanning as an item of document scanning. In this case, the determination portion 108 determines that the job indicated by the job setting to be stored is inexecutable by detected another image forming apparatus.

In addition, there may be a case of no discrepancy between the functional information and the job setting. More specifically, the functional information of detected another image forming apparatus indicates a scanning operation that is capable of double-sided scanning. The job setting to be stored indicates storing a document in a box and double-sided scanning as an item of document scanning. Furthermore, all contents indicated by other items are executable. In this case, the determination portion 108 determines that the job indicated by the job setting to be stored is executable by detected another image forming apparatus.

If the determination portion 108 determines that the job indicated by the job setting to be stored is executable by detected another image forming apparatus based on the acquired functional information (Step S22, YES), the following processes are executed. More specifically, a display control portion 109 causes the display portion 473 to display a message indicating that the job indicated by the job setting to be stored is executable by another image forming apparatus (in other words, the job setting is compatible with another image forming apparatus) (Step S23).

In contrast, if the determination portion 108 determines that the job indicated by the job setting to be stored is inexecutable by detected another image forming apparatus based on the acquired functional information (Step S22, NO), the following processes are executed. More specifically, the display control portion 109 causes the display portion 473 to display a message indicating that the job indicated by the job setting to be stored is inexecutable by another image forming apparatus (in other words, the job setting is not compatible with another image forming apparatus) (Step S30). The display control portion 109 causes a DISPLAY button for accepting an instruction for displaying a detailed result of determination to be displayed along with the message indicating incompatibility.

For example, the display control portion 109 causes the display portion 473 to display a compatibility information displaying screen D5, as exemplified in FIG. 11 after the determination by the determination portion 108. The display control portion 109 causes model names of all image forming apparatuses (4 in this example) detected by the apparatus detection portion 106 to be displayed in a model name column d51 of the compatibility information displaying screen D5. In addition, the display control portion 109 causes a status of compatibility of each of the image forming apparatuses to be displayed in a compatibility column d52 according to the result of determination by the determination portion 108. Furthermore, the display control portion 109 causes a DIS-PLAY button d54 for accepting an instruction for displaying a detailed result of determination to be displayed in a display column d53 for such apparatuses as being given a message indicating incompatibility in the compatibility column d52. The DISPLAY button d54 accepts an instruction for displaying detailed remarks including a reason why the job setting is inexecutable, or an inexecutable item.

When a user enters an instruction for storing the job setting to be stored through an operation portion 47 and the like after the display control portion 109 instructs displaying of the status of compatibility (Step S24, YES), the following processes are executed. More specifically, the job setting storing portion 103 associates the identification information entered in Step S18 with the job setting made in Step S16 and stores the identification information and the job setting in a USB memory connected to a storage medium connection interface 92 (Step S25).

For example, after the compatibility information displaying screen D5 is displayed, the user touches a CLOSE button d55 which the display control portion 109 causes to be displayed on the compatibility information display screen D5, and a touch screen portion detects touching. Accordingly, the job setting storing portion 103 stores the identification information and the job setting in the USB memory (Step S25). In other words, the job setting storing portion 103 performs a storing process to the USB memory in response to a detection signal transmitted from the touch screen portion upon detection of touching the CLOSE button d55 by a user as an instruction for storing the job setting to be stored.

If a user enters an instruction for cancelling the storing of the job setting by touching a CANCEL button d56 which the display control portion 109 causes to be displayed on the compatibility information displaying screen D5 (Step S24, No; Step S26, No), the flow terminates without the process for storing the job setting in the USB memory.

On the other hand, if a user touches the DISPLAY button d54 on the compatibility information displaying screen D5 to enter an instruction for displaying the detailed result of determination into the operation portion 47 (Step S24, No; Step S26, No), the following process is executed. More specifically, a specifying portion 110 specifies a reason why the job setting is inexecutable, or an inexecutable item (Step S27). The display control portion 109 causes the reason why the job setting is inexecutable or the inexecutable item to be displayed on a detailed item display screen D6 (Step S28) as shown in FIG. 12, for example.

For example, there may be a case in which the determination portion 108 has determined that the job indicated by the job setting to be stored is inexecutable by detected another image forming apparatus. The reason for such determination is based on a discrepancy between the functional information and the job setting. More specifically, the functional information of detected another image forming apparatus indicates a scanning operation that is capable of single-sided scanning but incapable of double-sided scanning. On the other hand, the job setting to be stored indicates storing a document in a box and double-sided scanning as an item of document reading. In this case, the display control portion 109 causes a message to be displayed on the detailed item display screen D6, such as "Double-sided scanning is not available in KM-1201. The following item is inexecutable: Double-sided scanning of document".

If a user enters an instruction to terminate a display of the detailed item display screen D6 by touching a CLOSE button d61 displayed on the detailed item display screen D6 (Step S29, YES), the following process is executed. More specifically, the display control portion 109 performs switching of a display from the detailed item display screen D6 to the compatibility information display screen D5, and the flow advances to Step S24. The display control portion 109 causes the display portion 473 to continue displaying the detailed item display screen D6 until an instruction to terminate the display of the detailed item display screen D6 is entered (Step S29, No; Step S28).

According to the second embodiment, a user stores a job setting in the USB memory after determining whether the job setting is executable by another image forming apparatus differing from the image forming apparatus 1 that has executed the job setting. In addition, when a user performs an operation for causing an image forming apparatus to read a job setting from a USB memory, the user performs the operation after checking the status of compatibility of the job setting with respect to the image forming apparatus. As a result, it is possible for the user to predict whether the operation based on the job setting leads to a malfunction of the image forming apparatus when the user causes the image forming apparatus to read the job setting stored in the USB device. Accordingly, it is possible to prevent or cope with a malfunction.

In addition, if the job indicated by the job setting is inexecutable by another image forming apparatus, the specifying portion 110 specifies an inexecutable item among items indicated by the job setting, based on the functional information corresponding to another image forming apparatus. The display control portion 109 causes the display portion 473 to display a result of determination indicating that the job setting is inexecutable by another image forming apparatus as well as the specified inexecutable item and the like. Accordingly, it is possible for the user to store the job setting in the USB memory after checking an inexecutable item among items in the job setting, when user operates the image forming apparatus in which the job setting is inexecutable.

It should be noted that the present disclosure is not limited to the above-described embodiments and can be carried out in various modes. For example, in the above-described embodiments, the image forming apparatus of the present disclosure has been described as a multifunction peripheral. However, the image forming apparatus according to the present disclosure is not limited thereto. For example, the image forming apparatus according to the present disclosure may be any apparatus that accepts an input of a job setting and executes a job based on the job setting, such as a copy machine, a facsimile machine, a scanning machine and the like.

It should be noted that the setup and process described in the above embodiments with reference to FIGS. 1 to 12 are merely exemplary embodiments of the present disclosure and in no way restrict the present disclosure to the setup and process.

The invention claimed is:

1. An image forming apparatus comprising:
a job setting acceptance portion configured to accept an input of a job setting indicating contents of a job from a user;
a control portion configured to execute the job setting accepted by the job setting acceptance portion;
an interface configured to connect to an external storage medium, the interface reading data from and writing data to the external storage medium;
an identification information acceptance portion configured to accept an input of identification information for identifying the job setting from the user;
a job setting storing portion configured to associate the identification information accepted by the identification information acceptance portion with the job setting executed by the control portion and to store the job setting and the identification information in the external storage medium via the interface;
a specific information acceptance portion configured to accept from the user the identification information for specifying the job setting to be acquired from the external storage medium, when the external storage medium is connected to the interface;
a job setting acquisition portion configured to acquire from the external storage medium the job setting associated with the identification information accepted by the specific information acceptance portion;
a function detection portion configured to detect function comprising at least a copy operation, a printing operation and a scanning operation to which the job setting stored in the external storage medium is applied from the job setting;
a display portion configured to display the functions detected by the function detection portion; and
a function selection acceptance portion configured to accept a selection of a function by the user among the functions which are detected by the function detection portion and displayed by the displayed portion,
wherein the job setting acquisition portion acquires the job setting corresponding to the identification information from the external storage medium, when the selection of the function is accepted by the function selection acceptance portion and the job setting acquisition portion determines that the job setting corresponding to the identification information of which entry is accepted by the specific information acceptance portion matches a job setting to which the function of which selection is accepted is applied,
wherein the job setting acquisition portion is configured not to acquire the job setting corresponding to the identification information from the external storage medium, when the selection of the function is accepted by the function selection acceptance portion and the job setting acquisition portion determines that the job setting corresponding to the identification information of which entry is accepted by the specific information acceptance portion does not match a job setting to which the function of which selection is accepted is applied, and wherein the control portion executes a job of normal log-in which is performed in accordance with the job setting directly entered by the user.

2. The image forming apparatus according to claim 1, further comprising:
an apparatus detection portion configured to detect another image forming apparatus connected to the image forming apparatus via a network;
a functional information acquisition portion configured to acquire from another image forming apparatus detected by the apparatus detection portion functional information indicating a function executable by another image forming apparatus;
a determination portion configured to determine whether the job indicated by the job setting to be stored is executable by another image forming apparatus corresponding to the functional information, based on the functional information acquired by the functional information acquisition portion, at a time of storing the job setting performed by the job setting storing portion; and a display control portion configured to cause the display portion to display a result of determination by the determination portion for each of another image forming apparatus.

3. The image forming apparatus according to claim 2, further comprising: a specifying portion configured to specify inexecutable items among items indicated by the job setting based on the functional information corresponding to another image forming apparatus, for a case where the determination portion determines that the job indicated by the job setting is inexecutable by another image forming apparatus, wherein the display control portion causes the display portion to display the inexecutable items specified by the specifying portion along with the result of determination.

* * * * *